United States Patent
Gieseke

(10) Patent No.: US 6,809,444 B1
(45) Date of Patent: Oct. 26, 2004

(54) FREE ROTATING INTEGRATED MOTOR PROPULSOR

(75) Inventor: Thomas J. Gieseke, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/679,681

(22) Filed: Oct. 6, 2003

(51) Int. Cl.⁷ .................. B63H 21/17; H02K 5/132
(52) U.S. Cl. ..................... 310/87; 310/67 R; 440/6
(58) Field of Search .................. 310/87, 112–114, 310/67 R; 440/6; 114/337–338

(56) References Cited

U.S. PATENT DOCUMENTS

| | | | | |
|---|---|---|---|---|
| 3,143,972 A | * | 8/1964 | Smith et al. | 417/356 |
| 4,648,345 A | * | 3/1987 | Wham et al. | 114/338 |
| 4,831,297 A | * | 5/1989 | Taylor et al. | 310/87 |
| 5,078,628 A | * | 1/1992 | Garis, Jr. | 440/6 |
| 5,289,068 A | * | 2/1994 | Veronesi et al. | 310/114 |
| 5,408,155 A | * | 4/1995 | Dickinson et al. | 310/90 |
| 5,607,329 A | * | 3/1997 | Cho et al. | 440/6 |
| 5,702,273 A | * | 12/1997 | Cho et al. | 440/6 |
| 5,941,744 A | * | 8/1999 | Levedahl | 440/6 |
| 6,015,272 A | * | 1/2000 | Antaki et al. | 417/356 |

\* cited by examiner

*Primary Examiner*—Burton Mullins
(74) *Attorney, Agent, or Firm*—James M. Kasischke; Michael F. Oglo; Jean-Paul A. Nasser

(57) ABSTRACT

An integrated motor propulsor includes a rotor which a plurality of rotor blades adapted to rotate about a center axis. An outer ring surrounding the rotor contacts one of the rotor blades and has a field means positioned on the outer ring. A duct is in low friction contact circumferentially outside the outer ring. A stator is positioned in the duct to interact with the field means. The duct also has a plurality of pitch control apparatuses pivotally joined to outboard blades which extend radially outward from the duct.

11 Claims, 1 Drawing Sheet

FREE ROTATING INTEGRATED MOTOR PROPULSOR

STATEMENT OF GOVERNMENT INTEREST

The invention described herein may be manufactured and used by or for the Government of the United States of America for governmental purposes without the payment of any royalties thereon or therefor.

BACKGROUND OF THE PRESENT INVENTION

(1) Field of the Invention

The present invention relates to an integrated motor propulsor comprising a free rotating duct assembly. More specifically, the present invention relates to a free rotating duct assembly incorporating a stator and outboard blades to provide counter-torque rotation about a plurality of rotor blades.

(2) Description of the Prior Art

The Integrated Motor Propulsor (IMP) is a propulsor design concept which integrates an electric motor with the moving parts of a ducted propeller. With reference to FIG. 1, there is illustrated a cross sectional rendering of the basic concept of an IMP 10. The centerline of an underwater vehicle is identified as 12 and the mouth of the ducted propeller is identified as 14. The rotor blades 16 of the propulsor act as the rotors of the motor while the stator 18 is housed in a duct assembly 20 encapsulating and encircling the rotor blades 16 about center line 12. In the IMP design of FIG. 1, permanent magnets 21 are positioned on the outside of rotor blades 16.

This propulsor design is ideal for isolating the propulsor 10 from the main vehicle body 22 and can provide high efficiency. The IMP 10 requires large physical duct supports 24 tying the duct assembly 20 to the vehicle body 22. Electrical current is provided from the vehicle to the stator 18 via an electrical connection 26 extending through support 24. These physical duct supports 24 on the IMP 10 are required to hold the duct assembly 20 stationary while large torques are applied to the rotor blades 16 as they spin about center line 12 under a load.

Although it is possible to engineer suitably large physical duct supports 24 to properly constrain the duct assembly 20, the hydroacoustic impact of having large struts upstream or downstream of the propulsor 10 can be significant. Blade rate tonals are produced when the disturbances from the rotor blades 16 periodically impact the duct supports 24.

What is therefore needed is an IMP design concept that eliminates the duct supports.

SUMMARY OF THE INVENTION

Accordingly, it is an object of the present invention to provide a free rotating duct assembly incorporating a stator and outboard blades to provide counter-torque rotation about a plurality of rotor blades.

In accordance with the present invention, an integrated motor propulsor includes a rotor having a plurality of rotor blades adapted to rotate about a center axis. Each of the plurality of rotor blades radially extends in a direction from the center axis to a terminus. A circular outer ring is in contact with the terminus of one of the rotor blades. A duct assembly is circumferentially disposed about the circular outer ring and in low friction contact with the circular outer ring. The duct assembly has a plurality of stators encircling the outer ring, and a plurality of outboard blades extending radially from the duct assembly. Each outboard blade is attached to a pitch control apparatus located in the duct.

DESCRIPTION OF THE PREFERRED EMBODIMENT(S)

Figure 1:
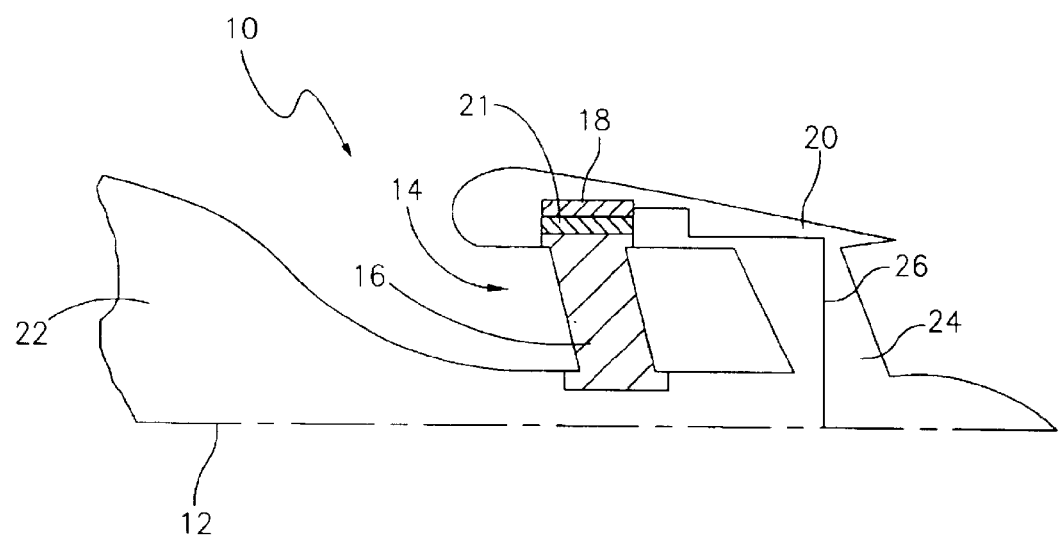
FIG. 1 provides a cross sectional illustration of an integrated motor propulsor known in the art.
Figure 2:
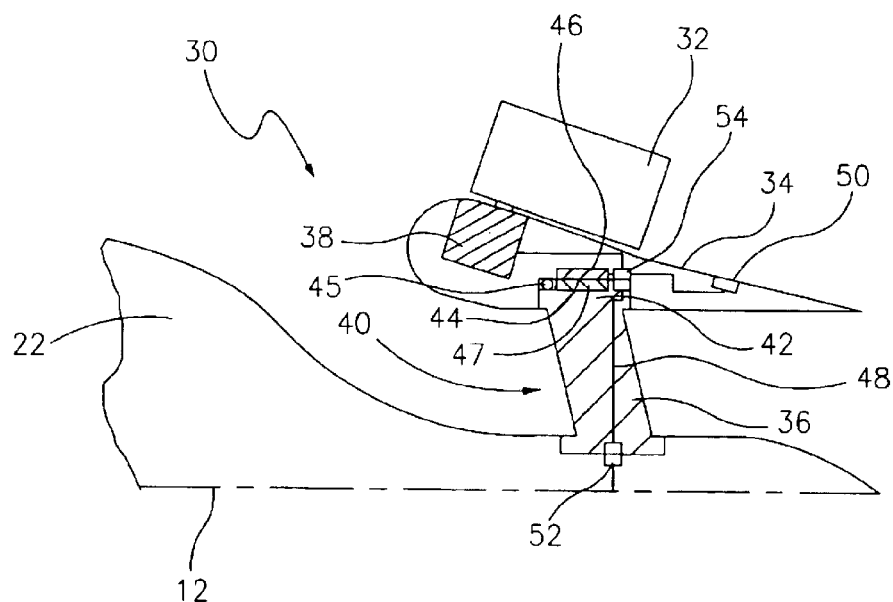
FIG. 2 provides a cross sectional illustration of an integrated motor propulsor (IMP) of the present invention.

With reference to FIG. 2, there is illustrated the free rotating IMP 30 of the present invention. In place of duct supports 24, a set of outboard blades 32 is attached on the outside of a duct assembly 34. Duct assembly 34 encircles the outermost periphery of a plurality of rotor blades 36. Each outboard blade 32 is pivotally attached to the duct assembly 34 by a pitch control apparatus 38. This pitch control apparatus 38 can be an articulation motor or the like. This allows the outboard blade 32 to operate as a variable pitch propeller. The detailed function of these components is described as follows.

The rotor blades 36 connect the duct assembly 34 to the vehicle body 22 defining a duct 40. In a preferred embodiment, an outer ring 42 connects, in circular form, the outermost portions of the rotor blades 36 and is in low friction contact 8 with an inner surface 44 of duct assembly 34. By "low friction contact" it is meant contact with sufficient clearance to enable the free rotational movement of the duct assembly 34 about the rotor blades 36. One preferred form of low friction contact involves the circumferential distribution of ball bearings 45 about outer ring 27 and in contact with inner surface 29.

A stator 46 is positioned on inner surface 44 where it can interact magnetically with permanent magnets 47 positioned in outer ring 42. Obviously, another magnetic field generating component could replace these permanent magnets. This component could be an electromagnet, induction coil or the like.

Rotor blades 36 serve several purposes. They act as the rotors in the electric motor. In addition, rotor blades 36 hold the duct assembly 34, and therefore the attached outboard blades 32, in connection to the vehicle body 22 via the outer ring 42. At least one of rotor blades 36 is hollow and is therefore configured to serve as a conduit for all electrical connections 48 to the stator 46, pitch control apparatus 38, and sensors 50 which can be mounted on the duct assembly 34. Examples of such sensors 50 include, but are not limited to, sensors 50 to measure the absolute and relative speed of the rotational motion of the stator 46 and rotor blades 36, velocity of flow across the surface of the duct assembly 34, and environmental pressure measurements.

Provision of power to stator 46 and communication with the sensors 50 is achieved by using an inner slip ring 52 and an outer slip ring 54. The inner slip ring 52 allows electrical communication between the rotary joint between vehicle body 22 and rotor blades 36. Inner slip ring 52 is joined by electrical connection 48 to outer slip ring 54. The outer slip ring 54 allows electrical communication between rotor blades 36 and pitch control apparatus 38, stator 46 and sensors 50.

The outboard blades 32 are each articulated with pitch control apparatus 38. Variation in the pitch of the outboard blades 32 controls the torque required to drive the outboard blade system and consequently controls the relative speed of the inboard rotor blades 36 and the outboard blades 32.

The outboard blades 32 are designed to provide an optimal counter-torque to drive the rotor. Absent the outboard blades 32 providing such a counter-torque, the duct assembly 34 would commence to spin at a high rate counter to the direction of the rotor blades 36 and waste potential thrust in the form of unwanted rotational momentum. In addition to providing a resistance for the motor to work against to drive the rotor, the outboard blades 32 act as a second set of propeller blades.

In an alternative embodiment, outboard blades 32 can be fixed directly to duct assembly 34. This embodiment provides duct assembly 34 with resistance to spinning, but it does not give the same control options as the preferred embodiment.

In operation, the free-rotating IMP functions as follows. At startup, all motor components are stationary and the vehicle is either stationary or moving through the water. When the IMP begins to attempt to drive the rotor blades 36, the rotor blades 36 begin to spin clockwise and simultaneously the duct assembly 34 begins to spin counterclockwise (or vise versa). The rotor blades 36 begin to draw fluid through the duct 40 and drive the vehicle forward. Both the rotor and the outer blade accelerate until the torque required to drive the rotor exactly equals the torque required to drive the duct and outer blades. The relative speed of the rotor and the duct is a function of the dimensions and geometry of the rotor and the outer blades.

The pitch control apparatus 38 can be used to adjust the operation of the outboard blades 32 to increase or decrease the torque required to drive the outer blades thus changing the relative speed of the two propulsors.

It is apparent that there has been provided in accordance with the present invention free rotating duct assembly incorporating a stator and outboard blades to provide counter-torque rotation about a plurality of rotor blades which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An integrated motor propulsor comprising:
   a rotor having a plurality of rotor blades adapted to rotate about a center axis, each rotor blade radially extending to a terminus;
   an outer ring in contact with at least one rotor blade terminus of said rotor;
   a field means positioned on said outer ring;
   a duct circumferentially disposed about said outer ring and in low friction contact with said outer ring;
   a stator positioned in said duct encircling said outer ring to interact with said field means;
   a plurality of pitch control apparatuses positioned in said duct; and
   a plurality of outboard blades extending radially outward from said duct, each pivotally attached to one of said plurality of pitch control apparatuses.

2. The device of claim 1 further comprising:
   a first slip ring joined to said rotor to allow electrical communication from the center axis to said rotor;
   a second slip ring joined between said outer ring and said duct to allow electrical communication from said outer ring to the duct, said second slip ring being electrically joined to said stator and said plurality of pitch control apparatuses; and
   means for electrical communication positioned in said at least one rotor blade in contact with said outer ring for electrically joining said first slip ring and said second slip ring.

3. The device of claim 2 further comprising at least one sensor positioned on said duct selected from the group consisting of speed sensors, flow velocity sensors, and environmental pressure sensors, said sensor being in electrical communication with said second slip ring.

4. The device of claim 2 wherein said field means is a permanent magnet.

5. The device of claim 2 wherein said field means is an electromagnet, said field means being electrically joined to said first slip ring.

6. The device of claim 1 further comprising a bearing positioned between said duct and said outer ring.

7. An integrated motor propulsor comprising:
   a rotor having a plurality of rotor blades adapted to rotate about a center axis, each rotor blade radially extending to a terminus;
   an outer ring in contact with at least one rotor blade terminus of said rotor;
   a field means positioned on said outer ring;
   a duct circumferentially disposed about said outer ring and in low friction contact with said outer ring;
   a stator positioned in said duct encircling said outer ring to interact with said field means; and
   a plurality of outboard blades extending radially outward from said duct.

8. The device of claim 7 further comprising:
   a first slip ring joined to said rotor to allow electrical communication from the center axis to said rotor;
   a second slip ring joined between said outer ring and said duct to allow electrical communication from said outer ring to the duct, said second slip ring being electrically joined to said stator; and
   means for electrical communication positioned in said at least one rotor blade in contact with said outer ring for electrically joining said first slip ring and said second slip ring.

9. The device of claim 8 further comprising at least one sensor positioned on said duct selected from the group consisting of speed sensors, flow velocity sensors, and environmental pressure sensors, said sensor being in electrical communication with said second slip ring.

10. The device of claim 8 wherein said field means is an electromagnet, said field means being electrically joined to said first slip ring.

11. The device of claim 7 wherein said field means is a permanent magnet.

* * * * *